United States Patent [19]

Azzarello

[11] Patent Number: 4,666,183
[45] Date of Patent: May 19, 1987

[54] ROLL-OVER PROTECTION DEVICE

[75] Inventor: Joseph A. Azzarello, Palos Heights, Ill.

[73] Assignee: J. I. Case Company, Racine, Wis.

[21] Appl. No.: 818,809

[22] Filed: Jan. 14, 1986

[51] Int. Cl.⁴ .............................................. B60R 21/13
[52] U.S. Cl. ..................................... 280/756; 296/102
[58] Field of Search ............................... 280/756, 748; 180/89.12, 89.15, 900; 296/102, 105, 107, 108

[56] References Cited

U.S. PATENT DOCUMENTS

| | | | |
|---|---|---|---|
| 3,289,871 | 12/1966 | Tourneau et al. | 296/102 X |
| 3,563,401 | 2/1971 | Gandolfo | 280/756 X |
| 3,578,377 | 5/1971 | Babbitt et al. | 296/102 |
| 3,733,103 | 5/1973 | Hansen | 280/756 X |
| 4,158,460 | 6/1979 | White | 280/756 |
| 4,304,142 | 12/1981 | Blomstrom | 180/89.15 X |

*Primary Examiner*—John J. Love
*Assistant Examiner*—Charles R. Watts
*Attorney, Agent, or Firm*—Peter N. Jansson

[57] ABSTRACT

An improved roll-over protection system for a tractor of the type having a three-point hitch with a hydraulic power lift. A roll-over protection structure is movable between retracted and erect positions and the hydraulic lift of the hitch apparatus is linked to the roll-over protection structure to raise and lower it. The link is either detachable when the structure is in place or has a slotted section allowing the hitch to be lifted without detachment of the link from the roll-over protection structure.

17 Claims, 3 Drawing Figures

ROLL-OVER PROTECTION DEVICE

FIELD OF THE INVENTION

This invention is related to safety equipment for farm tractors and, more specifically, to so-called roll-over protection structures.

BACKGROUND OF THE INVENTION

Many of the improvements in farm tractors are related to safety or to convenience of operation. This invention deals with both. It is an improvement in roll-over protection structures relating to the manner in which they are used.

Roll-over protection structures (or "bars") are strong generally U-shaped structural members secured to a vehicle on either side of the driver' position and extending overhead. The purpose of such devices is to protect the driver in the event of an accident, particularly an accident in which the vehicle rolls over or in which a heavy object falls on the vehicle. Roll-over protection structures are well-known in the prior art and have been used on farm tractors.

On occasion, roll-over protection structures can interfere with certain operations in which there is low overhead clearance. Because of this, some roll-over protection structures have been made adjustable. However, on large vehicles such as farm tractors, for which roll-over protection structures must be quite heavy, manipulating a roll-over protection structure between lowered and raised positions is difficult and inconvenient.

Adding hydraulic or other power equipment to move the roll-over protection structure may be an unsatisfactory answer, because of the complexity, space, and high cost involved. There is a need in tractors for an improved adjustable roll-over protection structure. It is this need which is addressed by this invention.

BRIEF SUMMARY OF THE INVENTION

This invention is an improved roll-over protection system for a farm tractor of the type having a three-point hitch with a hydraulic power lift. The roll-over protection structure of this invention is movable between retracted and erect positions, and the hydraulic lift of the hitch apparatus is linked to the roll-over protection structure to raise and lower it.

More specifically, this invention includes means adjustably mounting the roll-over protection structure to the tractor, allowing it to be movable between lowered and erect positions, and means linking the hydraulic power means of the hitch system to the roll-over protection structure so that it may be used for raising and lower the structure.

The linking means is preferably a rigid link arm or pair of arms. In the preferred embodiments, a pair of links is used, each being the same as the other. In describing preferred embodiments herein, reference is most frequently made for convenience to one link arm and to one of a various other elements which are preferably in pairs, as shown in the drawings. It is to be understood that such description of one such element applies to the other as well.

In one preferred embodiment, the link arm may be detached from the roll-over protection structure such that when the structure is in place, either erect or lowered, the hitch system may be operated in the normal manner without any impairment.

In certain preferred embodiments of this invention, the hydraulic power means includes a rock arm having driving end affixed to a hydraulically-powered horizontal shaft and a driven end to which the link arm is pivotably attached. The link arm is permanently pivotably attached at one end to the rock arm and the other end is detachably and pivotably connected to the roll-over protection structure.

In one highly preferred alternate embodiment, the link arm is extended to include a slotted portion to which the rock arm of the hydraulic drive is connected. Such link arm has a permanent pivotable attachment to the roll-over protection structure at one end and the slotted extension section at the other end. The driven end of the rock arm is pivotably attached in the slot. Such pivot attachment is freely movable along the slot.

In this embodiment, when the roll-over protection structure is in place and there is no need to move it from one position to another, the pivot attachment of the driven end of the rock arm will move freely back and forth within the slot as the rock arm is used in the normal manner to adjust the vertical position of the three-point hitch system. When it is necessary to move the roll-over protection structure, the rock arm will be rotated until the pivot attachment of the rock arm in the slot engages the upper end of the slot. As long as it is positioned there, movement of the rock arm will move the roll-over protection structure.

In certain preferred embodiments, common pivot attachment points are used for the attachment of the lifting link for the hitch means and the lifting link for the roll-over protection structure to the hydraulicly-driven rock arm.

The structure of this invention includes means independent of the hydraulic lift device to lock the roll-over protection structure in its erect position or its retracted position, so that it will not unexpectly fall or move.

Three-point hitch systems come in a variety of forms and use a variety of hydraulic lifting devices. Such hydraulic lifting devices may be linked to the roll-over protection structure in a variety of ways.

OBJECTS OF THE INVENTION

It is an object of this invention to provide an improved roll-over protection system for a farm tractor which overcomes certain deficiencies of the prior art.

Another object is to provide an improved roll-over protection system for tractors with three-point hitch systems.

Another object of this invention is to provide an improved roll-over protection structure which may easily be adjusted between retracted and erect positions.

Another object of this invention is to provide a roll-over protection structure which may be conveniently and reliably moved between its retracted and erect positions without having a power system dedicated for that purpose.

These and other objects will be apparent from the following additional descriptions and from the drawings, wherein:

DETAILED DESCRIPTIONS OF PREFERRED EMBODIMENTS

Figure 1:
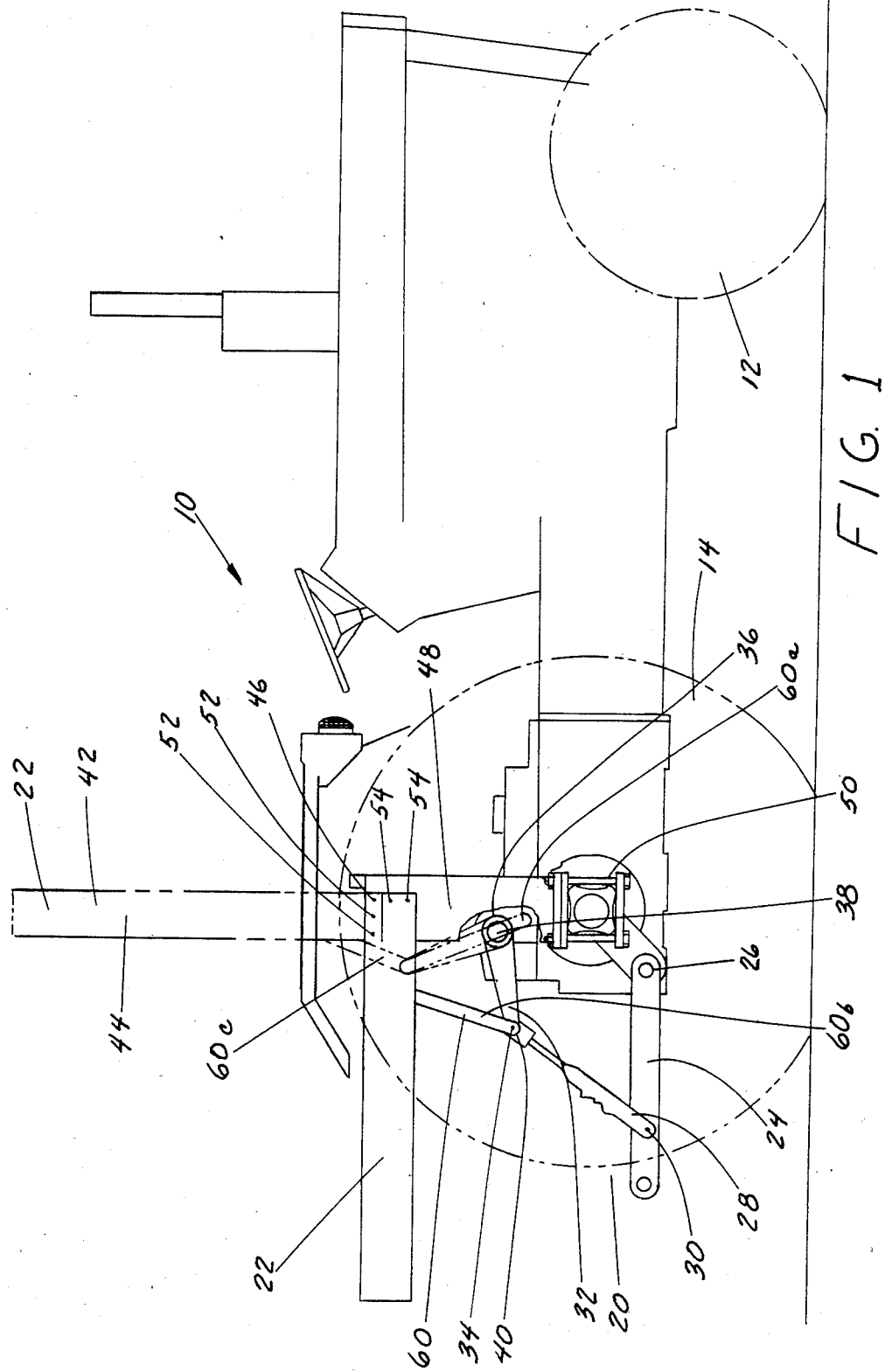
FIG. 1 is a schematic side elevation of a farm tractor in accordance with a preferred embodiment of this invention.
Figure 2:
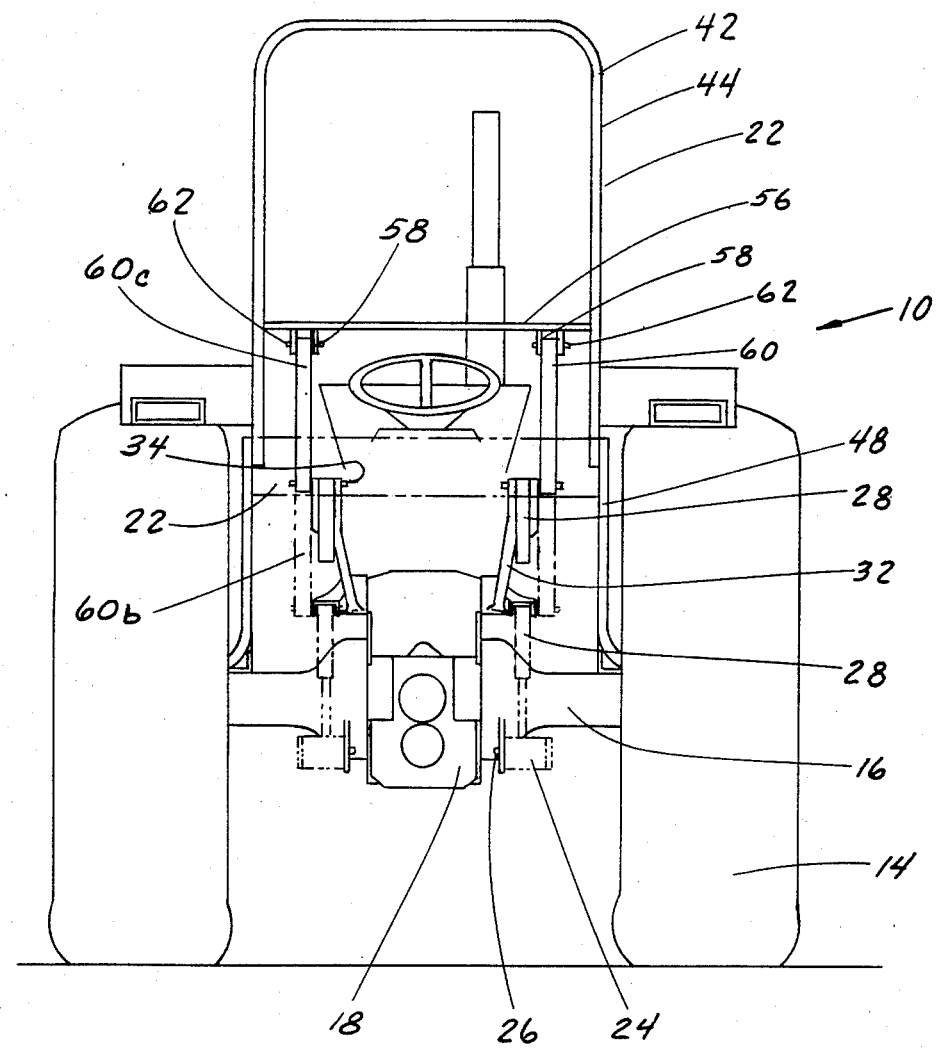
FIG. 2 is a rear elevation of FIG. 1.

FIGS. 1 and 2 illustrate a farm tractor 10 in accordance with a preferred embodiment of this invention. Tractor 10 has front and rear wheels 12 and 14, respectively, a rear axle housing 16, a transmission housing 18, a three-point hitch system indicated generally by numeral 20, and a roll-over protection structure 22.

Three-point hitch system 20 includes a pair of hitch lower links 24, a pair of hitch lift links 28, and a pair of rock arms 32. Hitch lower links 24 are pivotably attached at their proximal ends to other tractor structure at pivot points 26. The lower ends of hitch lift links 28 are attached at pivot points 30 to lower links 24 at intermediate positions along the length of lower links 24. The upper ends of lift links 28 are attached at pivot points 34 to rock arms 32. The pivot attachment means 34, by which lift link 28 is engaged with rock arm 32, is at the distal end of rock arm 32.

Rock arms 32 each have a driving proximal end 36, which is affixed to hydraulically-powered horizontal shaft 38. Horizontal shaft 38, which powers rock arms 32 thereon is part of the hydraulic means which operates three-point hitch system 20. In operation of three-point hitch system 20, clockwise movement of rock arms 32 (clockwise as shown in FIG. 1) serves to lift lower links 24 through lift links 28, and counter-clockwise movement serves to lower them.

In FIG. 1, lower links 24, lift links 28 and rock arms 32, as well as roll-over protection structure 22 and its lift links 60 (hereafter described), are illustrated by full lines in the lower position. The raised positions are illustrated by phantom lines.

In FIG. 2, the raised positions of rock arms 32 and other moving parts are illustrated in full lines and the lower positions are illustrated in phantom lines. To avoid an excess of lines, lower links 24 and lift links 28 are not illustrated in their upper positions.

Before describing the linkage between roll-over protection structure 22 and rock arms 32 of the hydraulic power system, roll-over protection structure 22 will be described. Roll-over protection structure 22 includes a generally U-shaped overhead bar 42 with side elements 44 which are pivotably attached by pivot shafts 46 to fixed side members 48. Fixed side members 48 are clamped on rear axle housing 16 by clamp devices 50, and are generally on either side of the place where the driver sits while operating tractor 10.

Overhead bar 42 is movable from a retracted (lowered) position, indicated by full lines in FIG. 1 and phantom lines in FIG. 2, and a raised (erect) position, illustrated by phantom lines in FIG. 1 and full lines in FIG. 2.

Overhead bar 42 is a structure of considerable weight in order to serve its intended purposes. Therefore, it must be secured in place when not being moved between the positions illustrated in FIGS. 1 and 2. To that end, a pair of removable lock members 52 extend between each of the side elements 44 of overhead bar 42 and its adjacent fixed side member 48. Similarly, a pair of lock members 54 secure overhead bar 42 in the lowered position.

Extending between side elements 44 of overhead bar 42 is a cros member 56. On the underside of cross member 56 are a pair of pivot-attachment devices 58. A pair of roll-over protection structure lift links 60 extend between rock arms 32 and roll-over protection structure 22. Lift links 60 extend from pivot points 34, by which they are attached to rock arms 32, and pivot-attachment devices 58, by which they are attached to roll-over protection structure 22.

Lift links 60 are a key element of this invention. They are the means by which the hydraulic power lift associated with three-point hitch system 20 is connected to roll-over protection structure 22.

Each of the lift links 60 is attached to one of the rock arms 32 at the point used for attachment of the rock arm to its hitch-lift link 28. Attachment could be at a different point, but such common attachment points are highly preferred.

In the embodiment illustrated in FIGS. 1 and 2, pivot-attachment devices 58 allow ready detachment of lift link 60 from roll-over protection structure 22. This may be accomplished simply by removing tie pins 62 and swinging lift link 60 away from cross member 56. When detached, lift links 60 may be kept in a nonuse position beside their rock arms 32, as illustrated by phantom lines at the location marked by numeral 60a.

In operation, when it is desired to move roll-over protection structure 22 from the retracted position to the erect position, lift links 60 are each swung from the nonuse position illustrated by 60a to the position indicated by 60b, at which point they are attached, by means of the tie pins 62 or other attachment means, to pivot-attachment devices 58. Then, the hydraulic lift system is operated, causing rock arms 32 to move in a clockwise direction (clockwise as shown in FIG. 1). This causes lift links 60 to move to the position indicated by 60c, lifting overhead bar 42 with it to the erect position.

At that point, lock members 52 are put in place and pivot-attachment devices 58 may be detached. After such detachment, the three-point hitch system 20 may be operated without any interference from roll-over protection structure 22.

Figure 3:
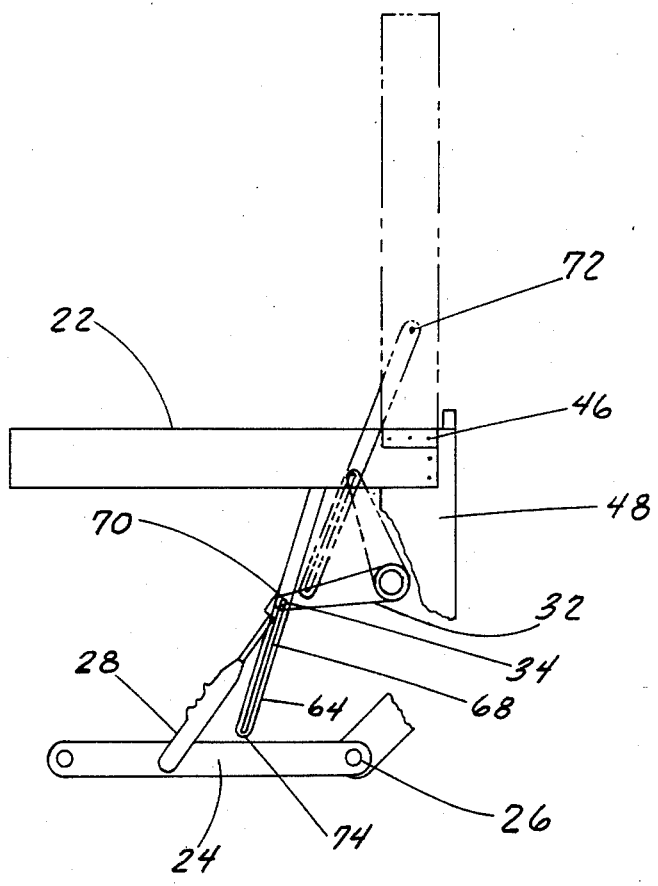
FIG. 3 is a fragmentary side elevation illustrating an alternate preferred embodiment.

In a highly preferred alternate embodiment of this invention, a somewhat different type of lift link is used to raise roll-over protection structure 22. These are slotted lift links 64, illustrated in FIG. 3.

Lift links 64, which join rock arms 32 with roll-over protection structure 22, are extended in length to include a slotted section at the ends attached to rock arms 32. The slot 68 in each of the links 64 extends therealong from an upper end 70, which is spaced from the pivot attachment 72 to the roll-over protection structure, to a lower end 74, which is more remote from pivot point 72.

Pivot attachments 72, in this alternate embodiment are permanent rather than detachable. And, when the hydraulically-driven rock arms 32 are not being used for moving the roll-over protection structure, the pivoting connection 34 between each rock arm 32 and its lift link 28 will slide within slot 68.

The apparatus of this invention may be made using materials and parts which are well-known to those skilled in the art. The invention may be embodied in many different forms.

While the principles of this invention have been described in connection with specific embodiments, it should be understood clearly that these descriptions are made only by way of example and are not intended to limit the scope of the invention.

What is claimed:

1. In a tractor of the type having rear hitch means, an operator's position, hydraulic power means for lifting the hitch means, and a substantially U-shaped roll-over protection structure including a pair of lateral members secured to the tractor immediately adjacent to the operator's position on opposite sides thereof, the improvement comprising:

means for adjustably mounting the roll-over protection structure to the tractor, said structure being movable between a retracted position in which the roll-over protection structure is substantially horizontal and an erect position in which the roll-over protection structure is substantially vertical; and means including a rigid link connected between said hydraulic power means and said roll-over protection structure for raising and lowering said roller-over protection structure.

2. The tractor of claim 1 further comprising means to lock said roll-over protection structure in the erect position.

3. The tractor of claim 2 further comprising means to lock said roll-over protection structure in the retracted position.

4. The tractor of claim 1 wherein said linking means is selectively detachable from said roll-over protection structure.

5. The tractor of claim 1 wherein the hydraulic power means comprises a rock arm having a driving end affixed to a powered horizontal shaft and wherein the linking means comprises a link arm which is pivotably attached to the rock arm at a first point spaced from said driving end and extends to a pivot attachment with the roll-over protection structure.

6. The tractor of claim 5 wherein the pivot attachment of the link arm to the roll-over protection structure is detachable.

7. The tractor of claim 6 wherein the-link arm, when detached from the roll-over protection, structure, is rotatable into non-use position beside the rock arm.

8. In a tractor of the type having rear hitch means, hydraulic power means for lifting the hitch means, and a roll-over protection structure, the hydraulic power means including a powered horizontal shaft and a rock arm with a driving end affixed to said powered shaft, the rear hitch means including a three-point hitch lower link and a three-point hitch lift link attached to the lower link and extending to a pivot attachment with the rock arm, the improvement comprising:

means for adjustably mounting the roll-over protection structure to the tractor, said structure being movable between a retracted position in which the roll-over protection structure is substantially horizontal and an erect position in which the roll-over protection structure is substantially vertical; and means for linking said hydraulic power means to said roll-over protection structure to use said hydraulic power means for raising and lowering said structure, said linking means including a link arm pivotably attached to the rock arm at a first point spaced from said driving end and extending to a pivot attachment with the roll-over protection structure.

9. The tractor of claim 8 wherein the link arm and the lift link are pivotably attached to the rock arm at a common pivot point.

10. The tractor of claim 9 wherein the pivot attachment of the link arm to the roll-over protection structure is detachable.

11. The tractor of claim 10 wherein the link arm, when detached from the roll-over protection structure, is rotatable into non-use position beside the rock arm.

12. In a tractor of the type having rear pitch means, hydraulic power means for lifting the hitch means, and a roll-over protection structure, improvement comprising:

means for adjustably mounting the roll-over protection structure to the tractor, said structure being movable between a retracted position in which the roll-over protection structure is substantially horizontal and an erect position in which the roll-over protection structure is substantially vertical; and means for linking said hydraulic power means to said roll-over protection structure to use said hydraulic power means for raising and lowering said roll-over protection structure, said linking means including a slot arm pivotably attached at one end to the roll-over protection structure and having a slot extending therealong and spaced from the pivot attachment of said slot arm to said roll-over protection structure, said hydraulic power means engaging the slot arm at variable positions in the slot whereby said hydraulic power means can operate the hitch means without detachment of said inking means.

13. The tractor of claim 12 wherein the hydraulic power means comprises a rock arm having a driving end affixed to a powered horizontal shaft and a driven end pivotably attached at a first point therealong to said slot and freely movable along said slot.

14. The tractor of claim 13 wherein the rear hitch means includes a three-point hitch lower link and a three-point hitch lift link attached to said lower link and extending to a pivot attachment with said rock arm.

15. The tractor of claim 14 wherein the slot arm and the lift link are pivotably attached to the rock arm at a common pivot point.

16. The tractor of claim 15 further comprising means to lock said roll-over protection structure in the erect position.

17. The tractor of claim 16 further comprising means to lock said roll-over protection structure in the retracted position.

\* \* \* \* \*